United States Patent [19]

Lu

[11] Patent Number: 5,674,037
[45] Date of Patent: Oct. 7, 1997

[54] SCREW HAVING AN IMPROVED HEAD STRUCTURE

[76] Inventor: Cheng-chuan Lu, 19F-3, No. 50, Lane 355, Chunghua Rd., Yungkang City, Tainan Hsien, Taiwan

[21] Appl. No.: 688,545

[22] Filed: Jul. 30, 1996

[51] Int. Cl.⁶ .................. F16B 23/00; F16B 35/06
[52] U.S. Cl. .................. 411/410; 411/404; 411/919
[58] Field of Search .................. 411/402, 403, 411/404, 410, 919

[56] References Cited

U.S. PATENT DOCUMENTS

| | | | |
|---|---|---|---|
| 1,910,182 | 5/1933 | Robertson | 411/410 |
| 3,329,057 | 7/1967 | Salz | 411/919 X |
| 4,089,357 | 5/1978 | Gill | 411/919 X |
| 5,020,954 | 6/1991 | Dreger | 411/919 X |
| 5,214,987 | 6/1993 | Fenton, Sr. | 411/410 X |
| 5,358,368 | 10/1994 | Conlan et al. | 411/410 |

Primary Examiner—Neill R. Wilson
Attorney, Agent, or Firm—Schmeiser, Olsen & Watts

[57] ABSTRACT

A screw includes a head and a shank which extends from one side of the head, a substantially cubic recess defined by four sides in the other side of the head, each of the four sides having a short slot perpendicularly outwardly extending therefrom and each of the four short slots communicating with the cubic recess.

9 Claims, 5 Drawing Sheets

FIG.3
PRIOR ART
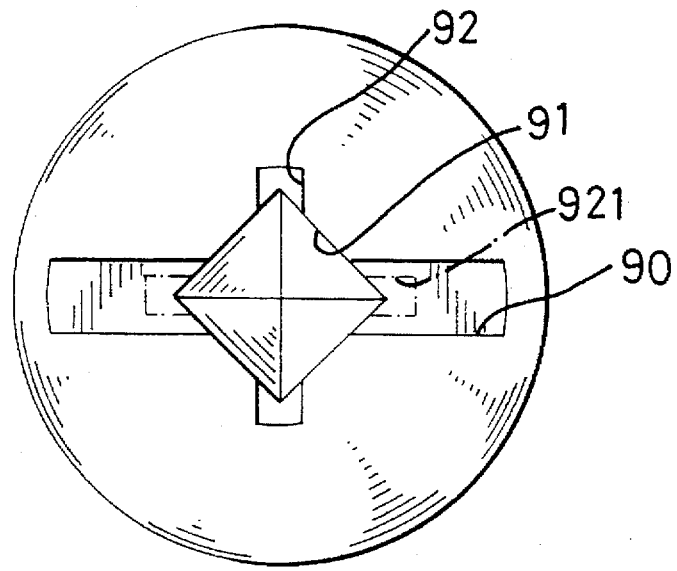
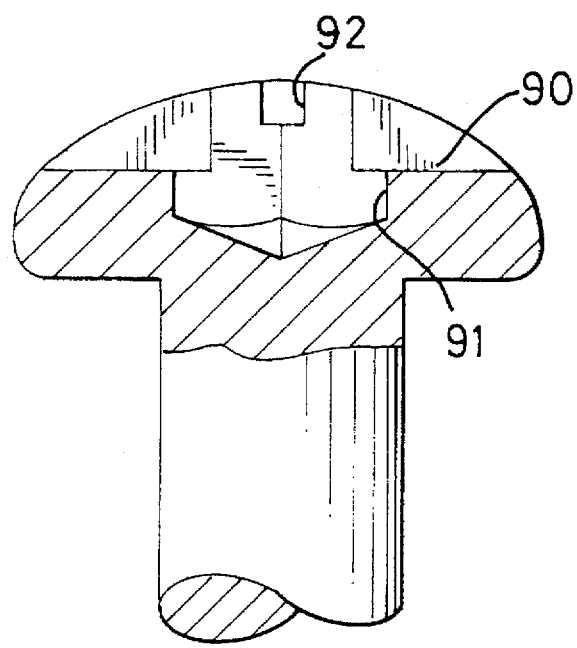
FIG.4
PRIOR ART

FIG.10
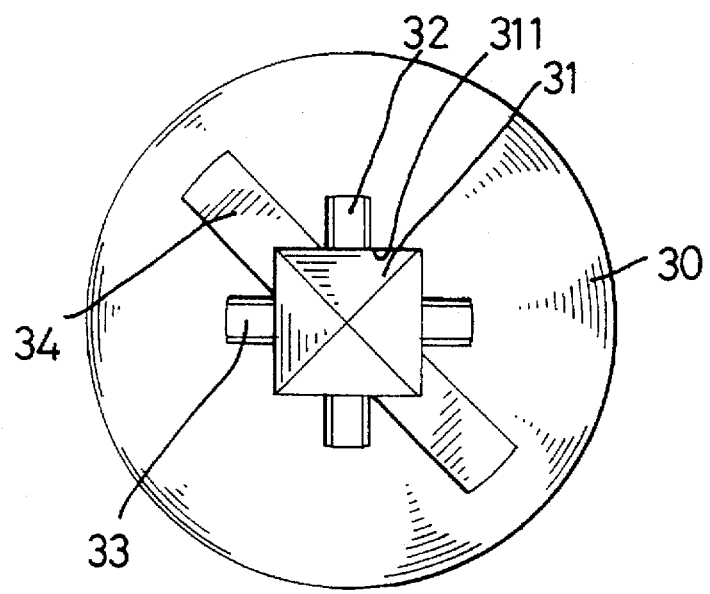
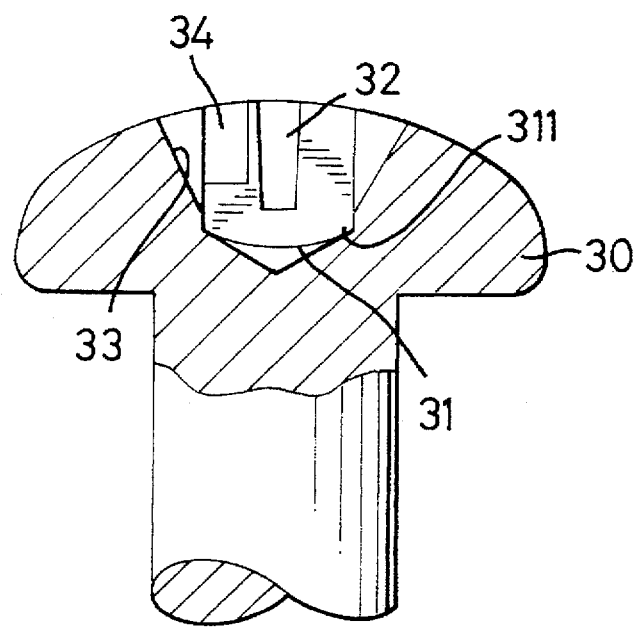
FIG.11

SCREW HAVING AN IMPROVED HEAD STRUCTURE

BACKGROUND OF THE INVENTION

1. Field of the Invention

The present invention relates to a screw and more particularly, to a head of a screw and which has engaging recesses defined therein for different types of screw drivers to be received therein.

2. Brief Description of the Prior Art

FIGS. 1 and 2 show one type of conventional head of a screw, the head having a first substantially cubic recess 81 defined therein so as to cooperate with a screw driver having a protrusion (both not shown) with the same shape as the first cubic recess 81. A first short slot 80 extends from each of the corners of the first cubic recess 81 and communicates with the first cubic recess 81. Therefore, the head of the screw can be cooperated with the type of the screw driver with the square protrusion (Robertson tip) which is inserted into the first cubic recess 81 and with the type of the screw driver with a cross protrusion (Phillips tip). However, the Robertson tip can only contact the inner sides defining the first short slots 80 and the effect area of the inner sides contacting the Phillips tip is so limited such that a sufficient torque can not be achieved. Similarly, an area of the inner sides defining the first cubic recess 81 is reduced by the first short slots 80 so as to reduce the effective contacting surface between the Robertson tip of the screw driver and a periphery defining the cubic recess 81.

FIGS. 3 and 4 show another type of a head of a screw, the head is similar to that shown in FIGS. 1 and 2, that is to say, the head in the FIGS. 3 and 4 has a second substantially cubic recess 91 and each of the four corners of the second cubic recess 91 has a second short slot 92/921 extending therefrom and communicating therewith. A long slot 90 is defined in the head and shares a common axis of the diagonal line of the second square recess 91, the long slot 90 has a depth deeper than that of the short slots 92 such that a screw driver with a flat tip can be used to cooperate with this type of head of the screw. Thus, the effective contacting area between a periphery defining the second cubic recess 91 and the screw driver is even more reduced compared with that shown in FIGS. 1 and 2.

Accordingly, the arrangement of the short slots and the cubic recess traverses a transmission of the torque exerted from the screw driver, this often damages the heads of the screw and the screw driver.

The present invention intends to provide an improved screw which has a head which can cooperate with the Robertson screw driver, the Phillips screw driver and the flat screw driver without traversing a transmission of torques exerted from the three different types of screw drivers so as to mitigate and/or obviate the above-mentioned problems.

SUMMARY OF THE INVENTION

The present invention provides a screw which includes a head and a shank which extends from one side of the head, a substantially cubic recess defined by four sides in the other side of the head, each of the four sides having a short slot perpendicularly outwardly extending therefrom and each of the four short slots communicating with the cubic recess such that a torque will be transmitted efficiently whenever a Robertson screw driver or a Phillips screw driver are used.

It is an object of the present invention to provide a screw with a head having receiving recesses suitable for different types of screw drivers.

It is another object of the present invention to provide a screw with a head having the receiving recesses which allow different types of screw drivers to be engaged with peripheries thereof and transmit a torque thereto sufficiently.

Other objects, advantages, and novel features of the invention will become more apparent from the following detailed description when taken in conjunction with the accompanying drawings.

BRIEF DESCRIPTION OF THE DRAWINGS

FIG. 3 is a top plan view to show a head of a second kind of conventional screw;

FIG. 4 is a side elevational view, partly in section, of the conventional screw as shown in FIG. 3;

FIG. 10 is a top plan view to show a head of a third embodiment of the screw in accordance with the present invention, and FIG. 11 is a side elevational view, partly in section, of the third embodiment of the screw.

DETAILED DESCRIPTION OF THE PREFERRED EMBODIMENTS

Figure 1:
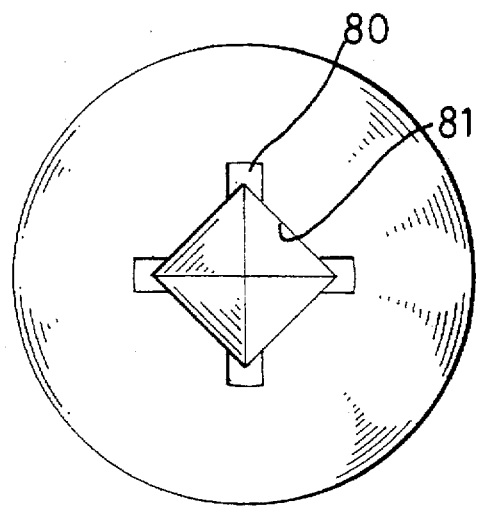
FIG. 1 is a top plan view to show a head of a first kind of conventional screw.
Figure 2:
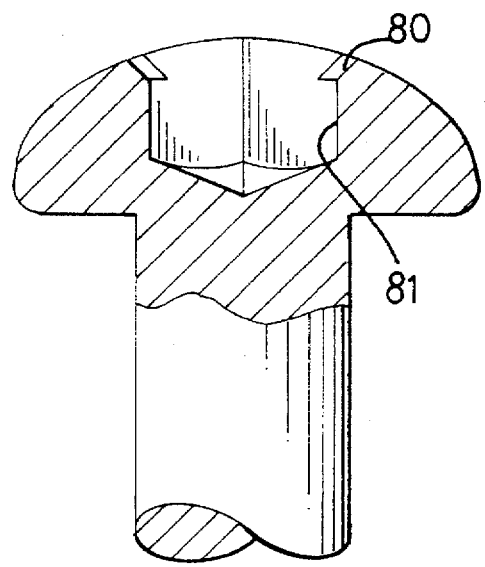
FIG. 2 is a side elevational view, partly in section, of the conventional screw as shown in FIG. 1.
Figure 5:
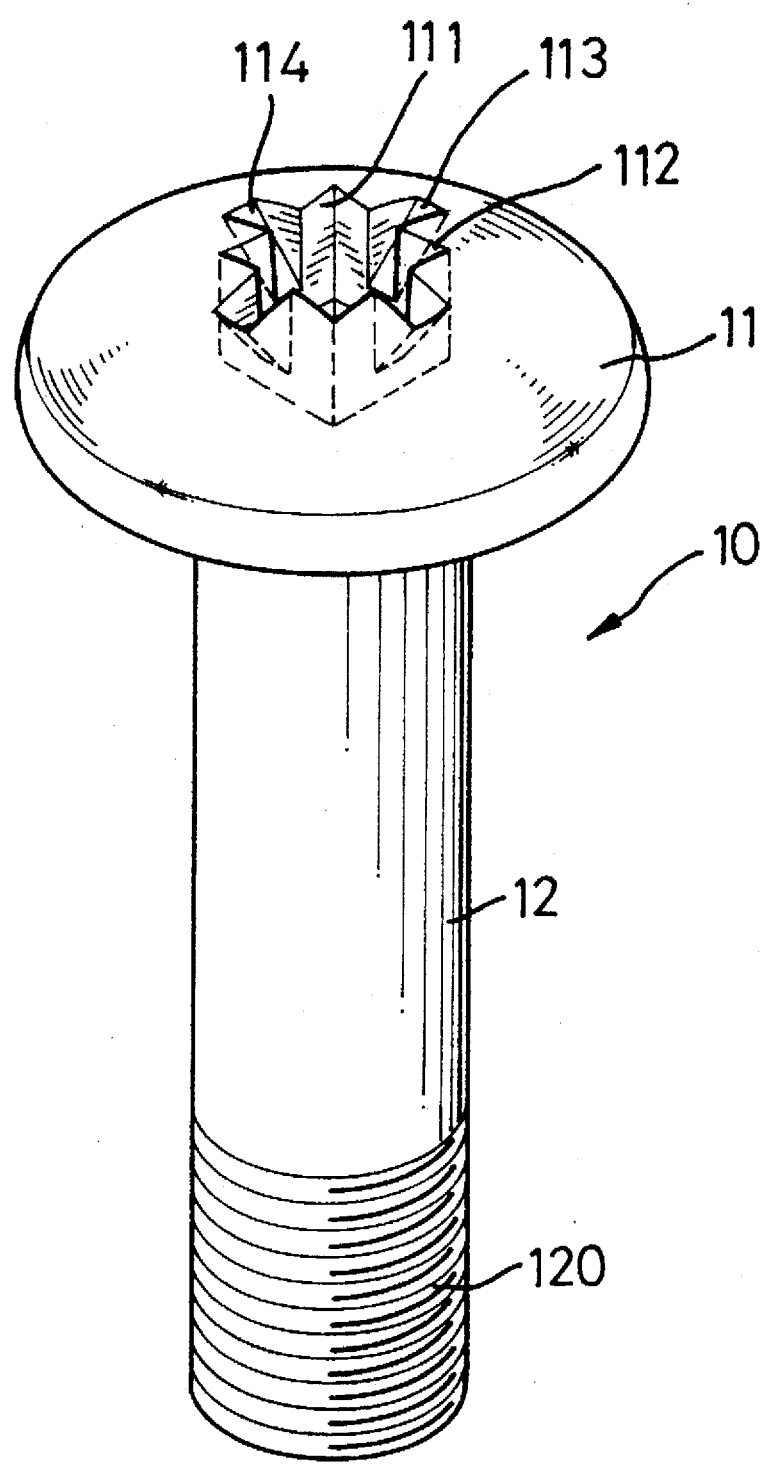
FIG. 5 is a perspective view of a screw in accordance with the present invention.
Figure 6:
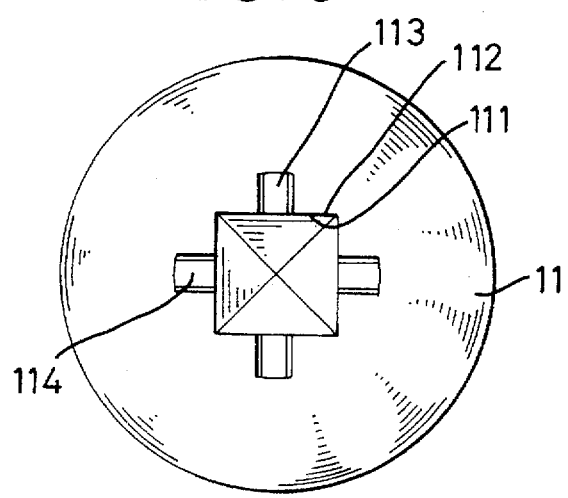
FIG. 6 is a top plan view to show a head of the screw as shown in FIG. 5.
Figure 7:
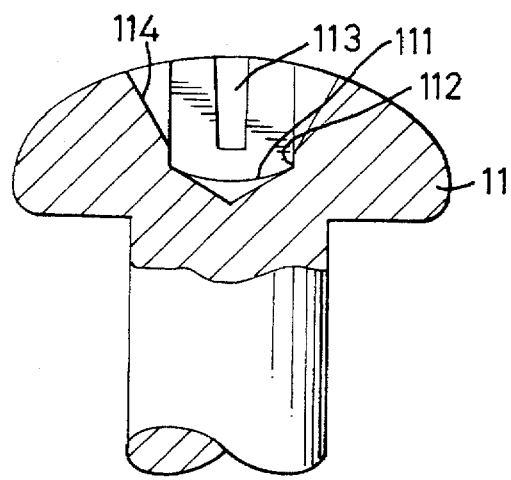
FIG. 7 is a side elevational view, partly in section, of the screw as shown in FIG. 5.

Referring to the drawings and initially to FIGS. 5 through 7, a screw 10 in accordance with the present invention generally includes a head 10 and a shank 12 which extends from one side of the head 11 and has a threaded portion 120 defined in an outer periphery thereof.

The head 11 has a substantially cubic recess 112 defined by four sides 111 in the other side (top side) of the head 11, each of the four sides 111 having a short slot 113/114 perpendicularly outwardly extending therefrom, each of the four short slots 113/114 communicating with the cubic recess 112. The cubic recess 112 is deeper than the short slots 113/114 in the head 11. Accordingly, each one of four corners of the square recess 112 is maintained complete such that when a tool with Robertson type protrusion (not shown) is inserted in the cubic wrecess 112, there will be an efficient torque transmission transmitted via the engagement between the Robertson type protrusion and a periphery defining the cubic recess 112.

Figure 8:
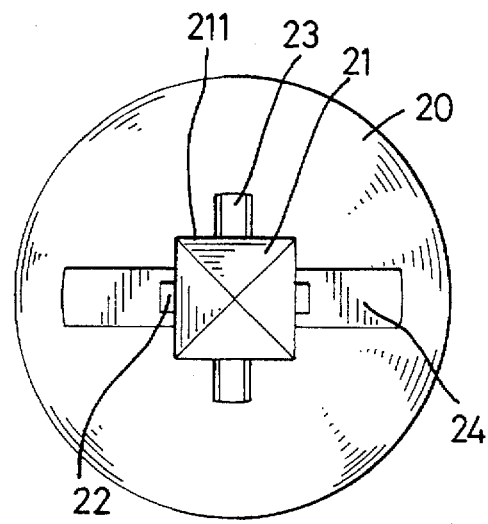
FIG. 8 is a top plan view to show a head of a second embodiment of the screw in accordance with the present invention.
Figure 9:
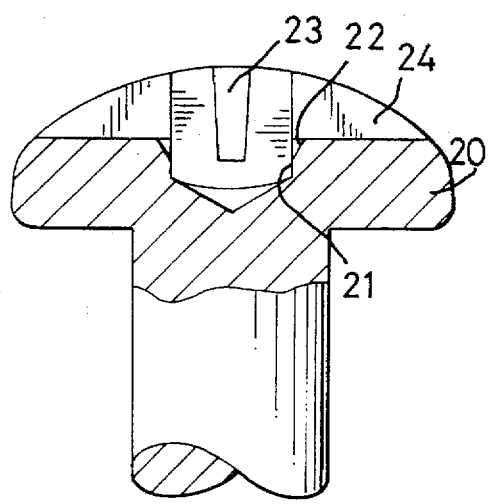
FIG. 9 is a side elevational view, partly in section, of the second embodiment of the screw.

FIGS. 8 and 9 show a second embodiment of the head 20 in accordance with the present invention and which is similar to that shown in FIG. 5 and includes a cubic recess 21 defined in the head 20 and the cubic recess 21 is defined by four sides 211. Each one of the four sides 211 has a short slot 22/23 which extends outwardly therefrom. A long slot 24 is defined in the head 20 and communicates with the cubic recess 21. The long slot 24 extends perpendicularly to two opposite sides 211 of the cubic recess 21. The short slots 22, 23 are deeper than the long slot 24 in the head 20 and the cubic recess 21 is deeper than the short slots 22, 23.

FIGS. 10 and 11 show a third embodiment of the head 30 in accordance with the present invention and which is similar to that shown in FIG. 5 and includes a cubic recess 31 defined in the head 30 and the cubic recess 31 is defined by four sides 311. Each one of the four sides 311 has a short slot 32/33 which extends outwardly therefrom. A long slot 34 is defined in the head 30 and communicates with the square recess 31. The long slot 34 and diagonal axis of the square recess 31 share a common axis. The short slots 32, 33 are deeper than the long slot 34 in the head 30 and the square recess 31 is deeper than the short slots 32, 33.

Accordingly, none of the three embodiments in accordance with the present invention reduces an effective contacting area between the tool and respective peripheries defining the cubic recess/the short slots/the long slot, thus a desired torque transmission is achieved.

Although the invention has been explained in relation to its preferred embodiment, it is to be understood that many other possible modifications and variations can be made without departing from the spirit and scope of the invention as hereinafter claimed.

What is claimed is:

1. A screw comprising:

a head and a shank which extends from one side of said head, and a substantially cubic recess defined by four sides in the other side of said head, each of said four sides having a short slot perpendicularly outwardly extending therefrom, each of said four short slots communicating with said substantially cubic recess and said substantially cubic recess being deeper than said short slots in said head.

2. The screw as claimed in claim 1 further comprises a long slot defined in said head and said long slot communicates with said substantially cubic recess.

3. The screw as claimed in claim 2 wherein said long slot and a diagonal axis of said substantially cubic recess share a common axis.

4. The screw as claimed in claim 2 wherein said long slot extends perpendicularly to two opposite sides of said substantially cubic recess.

5. The screw as claimed in claim 2 wherein said short slots are deeper than said long slot in said head.

6. A screw comprising:

a head and a shank which extends from one side of said head, and a substantially cubic recess defined by four sides in the other side of said head, each of said four sides having a short slot perpendicularly outwardly extending therefrom, each of said four short slots communicating with said substantially cubic recess, and a long slot defined in said head and communicating with said square recess, said long slot extending perpendicularly to two opposite sides of said square recess.

7. The screw as claimed in claim 6 wherein said square recess is deeper than said short slots in said head.

8. The screw as claimed in claim 6 wherein said long slot and a diagonal axis of said substantially cubic recess share a common axis.

9. The screw as claimed in claim 6 wherein said short slots are deeper than said long slot in said head.

* * * * *